United States Patent
Noll et al.

Patent Number: 6,153,974
Date of Patent: Nov. 28, 2000

[54] HALOGEN INCANDESCENT LAMP

[75] Inventors: Thomas Noll, Kipfenberg; Karlheinz Vogl, Regensburg; Rudolf Horndasch, Gaimersheim; Matthias Damm, Heidenheim, all of Germany

[73] Assignee: Patent-Treuhand-Gesellschaft fuer Elektrische Gluehlampen mbH, Munich, Germany

[21] Appl. No.: 09/396,619

[22] Filed: Sep. 15, 1999

[30] Foreign Application Priority Data

Sep. 23, 1998 [DE] Germany .................. 198 43 525

[51] Int. Cl.[7] ................................... H01J 17/20
[52] U.S. Cl. ................ 313/643; 313/578; 313/637
[58] Field of Search ................... 313/637, 638, 313/643, 315, 557, 569, 578, 579

[56] References Cited

U.S. PATENT DOCUMENTS

| | | | |
|---|---|---|---|
| 3,464,026 | 8/1969 | Moeller | 313/643 |
| 3,798,491 | 3/1974 | Malm | 313/578 |
| 4,015,157 | 3/1977 | Roller et al. | 313/25 |
| 4,419,605 | 12/1983 | Branston | 313/643 |
| 5,093,601 | 3/1992 | Watanabe et al. | 313/578 |
| 5,896,007 | 4/1999 | Dobiasch et al. | 313/578 |
| 5,955,840 | 9/1999 | Arnold et al. | 313/637 |

OTHER PUBLICATIONS

G. Maier, Technisch–wissenschaftliche Abhandlungen der Osram–Gesellschaft, vol. II, Springer Verlag (1973) pp. 55–59.

*Primary Examiner*—Vip Patel
*Assistant Examiner*—Mariceli Santiago
*Attorney, Agent, or Firm*—Robert F. Clark

[57] ABSTRACT

As its filling, a halogen incandescent lamp contains noble gas, halogen additive, carbon as well as nitrogen and oxygen in the form of a nitrogen-oxygen compound, preferably $N_2O$.

13 Claims, 1 Drawing Sheet

HALOGEN INCANDESCENT LAMP

TECHNICAL FIELD

The invention is based on a halogen incandescent lamp according to the preamble of claim 1. The type of lamp in question is, in particular, a low-voltage incandescent lamp, with a conventional high-pressure filling or, alternatively, a novel low-pressure filling.

PRIOR ART

PCT/DE94/01526 has already disclosed a halogen incandescent lamp for low-voltage operation, that is to say up to about 60 V (typically 6 to 24 V). The customary filling pressure in the case of the high-pressure version is 5 to 15 bar of an inert gas. Recently, low-pressure versions have also become possible, whose filling pressure is typically 0.1 to 5 bar. Xenon or krypton is normally used as the inert gas, and iodethane ($C_2H_5I$), for example, as the halogen additive. In these lamps, nitrogen ($N_2$) is often added in order to obtain stable switching performance. The proportion of $N_2$ is in this case customarily about 5 to 10%. The addition of nitrogen can, however, lead to premature blackening and therefore a reduced life.

U.S. Pat. No. 4,015,157 discloses a halogen incandescent lamp with long life for high-voltage operation, whose filling, besides noble gas, a halogenated hydrocarbon compound, only iodine being allowed as the halogen, and nitrogen to suppress arcing, also contains oxygen (to suppress the blackening of the bulb) in the form of CO. However, this entails a high total carbon content, which can make the metal parts in the bulb brittle. A sufficient amount of oxygen may also be provided simply by the air remaining as residual impurity in the bulb during evacuation (this is referred to as residual oxygen). A problem with this is that the residual oxygen content is subject to large fluctuations, since it depends on how refined the evacuation process is, so that a reliable long life is difficult to achieve. In particular, it is very expensive when the evacuation process needs to be monitored with meticulous accuracy.

The importance of the role of oxygen for the halogen cycle has already been described comprehensibly in Technisch-wissenschaftlichen Abhandlungen der Osram-Gesellschaft [Techno-Economic Proceedings of the Osram company], Vol. 11, Springer Verlag 1973, p. 55–59. According to this, in the case of iodine and of bromine as the halogen, the presence of a small amount of oxygen, possibly as the oxygen compound CO, is necessary for the cycle process.

DESCRIPTION OF THE INVENTION

The object of the present invention is to provide a halogen incandescent lamp according to the preamble of claim 1, which has stable switching performance and, at the same time, a long life.

This object is achieved by the distinguishing features of claim 1. Particularly advantageous refinements can be found in the dependent claims.

The halogen incandescent lamp according to the invention is distinguished by the filling components which follow: noble gas, halogen additive, carbon, nitrogen and oxygen.

At least one of the noble gases Ar, Kr and Xe is used s the inert gas. Iodine or bromine, and possibly also odine in conjunction with bromine, are suitable as the halogen. The proportion of the halogen should be approximately in the range between 0.02 and 2 mol %. The amount of carbon added should, in particular, be proportioned in such a way that the halogen:carbon ratio is between 1 and 5. Carbon is advantageously added as a halogenated hydrocarbon compound. A guideline which may be used for the addition of oxygen is the condition that the oxygen proportion should be selected in such a way that the carbon, which comes from the hydrocarbon compound and from impurities which may be present, for example from the wire of the luminous element, should be oxidizable as fully as possible during operation to form CO. In particular, a molar ratio $C:O \leq 1$ can give good results.

It has surprisingly been shown that even very minor addition of $N_2$, less than 1 mol %, is sufficient to obtain stable switching performance and prevent the formation of an arc which causes premature failure. Since it has been established that $N_2$ promotes rapid blackening of the bulb, very small apportioning of the $N_2$ is compliant with having long lives for halogen incandescent lamps.

It has now been possible to find an ideal combination as a solution to both problems in the use of a nitrogen-oxygen compound, preferably $N_2O$ (nitrous oxide). This is because only small apportioning is needed for both components, so that they can be added together in a single compound. In addition, the carbon proportion is not increased. In terms of oxygen, a further advantage is that a very accurately defined amount of this component is added. It is assumed in this case that the amount of oxygen added can be considerably greater than the natural residual oxygen content. Reproducible conditions will therefore prevail without extreme care having to be taken during the evacuation process.

Besides nitrous oxide, other nitrogen oxides such as NO or $NO_2$ may be suitable as the nitrogen-oxygen compound. Nitrous oxide is distinguished in that, in chemical terms, it is relatively stable. It is highly compressible, so that during manufacture it can be provided at high pressure. It does not decompose until the lamp is operated, when its two components are liberated. Nitrous oxide complies best with the ratio $N:O \geq 1$ favorable for low-voltage lamps, in particular at low pressure. Primarily in the case of low-pressure lamps, the $N_2$ which is released can act as a quenching gas for an arc that may possibly occur. The nitrous oxide is preferably apportioned at between 200 ppm and 0.8 mol %, advantageously between 0.2 and 0.8 mol %. The low proportion of nitrogen is sufficient to give the lamps stable switching performance and prevent sparkover. The low proportion of oxygen is enough to sustain the halogen cycle process and therefore prevent blackening of the bulb. Even with medium-voltage and high-voltage lamps (operation at voltages between 80 and 240 V), the problem of sparkover between parts of the luminous element and the electrical leads can be solved by this.

Krypton has proved especially favorable as the noble gas. In the case of low-pressure lamps, iodethane and methyliodide have above all proved favorable as the halogen additive. In the case of high-pressure lamps, additives containing bromine and iodine are also highly suitable in conjunction with $N_2O$. The iodethane is advantageously proportioned in relation to nitrous oxide in such a way that its molar ratio is in the 1:3 to 3:1 range.

FIGURES

The invention will be explained in more detail below with reference to several illustrative embodiments.

FIG. 1 shows a halogen incandescent lamp in low-voltage technology.

Figure 1:
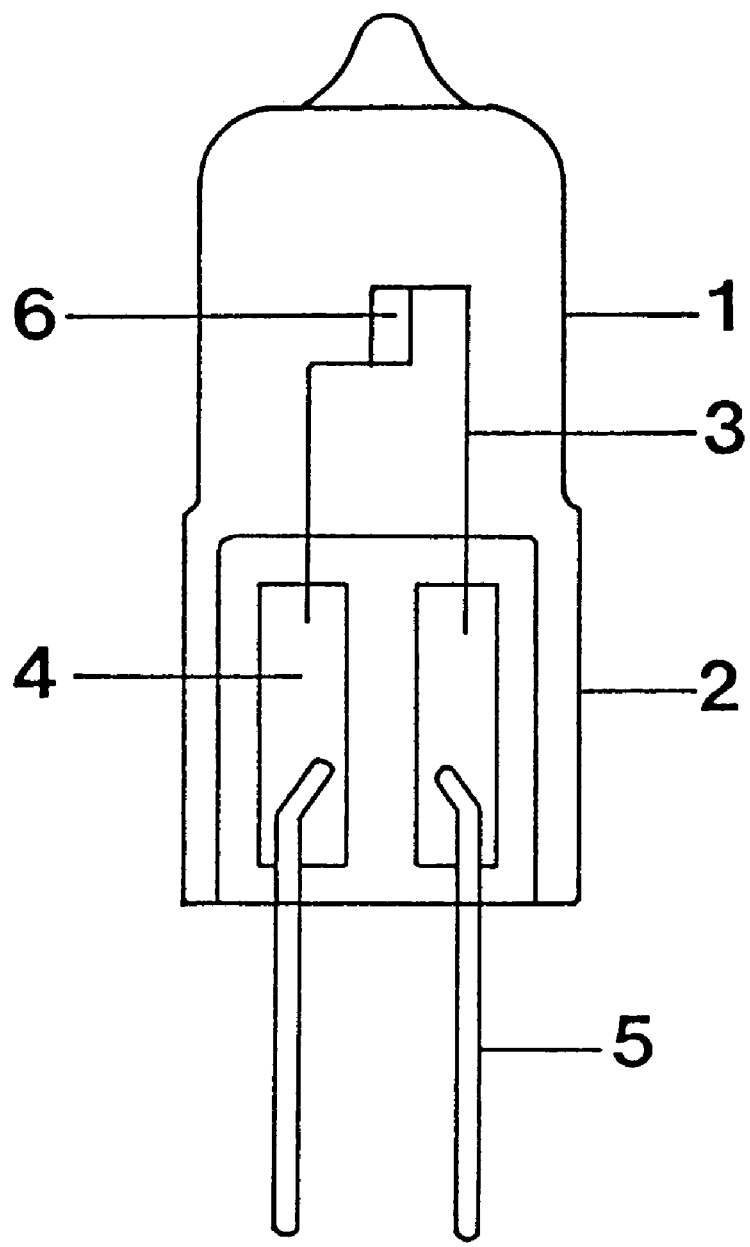
FIG. 1 shows a halogen incandescent lamp with a rated voltage of 6 V and a power of 10 W. It consists of a quartz glass bulb 1 which is closed on one side by a pinch seal 2. A luminous element 6 is arranged axially inside the bulb. It is supported by two electrical leads 3 which are connected to molybdenum foils 4 in the pinch seal. The foils 4 are for their part connected to external base pins 5.

In a first illustrative embodiment in low-pressure technology, the filling consists of 1 bar krypton with the addition of 0.2 mol % iodethane ($C_2H_5I$) or $CH_3I$. 0.3 mol % $N_2O$ is also added.

In a second illustrative embodiment in high-pressure technology, the filling consists of 8 bar krypton with the addition of 0.1 mol % iodethane ($C_2H_5I$) or methyliodide $CH_3I$. 0.05 mol % $N_2O$ is also added.

What is claimed is:

1. A halogen incandescent lamp having a bulb (1), which contains at least one luminous element (6), and having a filling made of noble gas and a halogen additive that contains iodine, the filling also comprising carbon and nitrogen, wherein the filling additionally contains oxygen in the form of a nitrogen-oxygen compound.

2. The halogen incandescent lamp as claimed in claim 1, wherein the carbon is added as a halogenated hydrocarbon.

3. The halogen incandescent lamp as claimed in claim 2, wherein the hydrocarbon is $C_2H_5I$ or $CH_3I$.

4. The halogen incandescent lamp as claimed in claim 3, wherein the nitrogen-oxygen compound is a nitrogen oxide.

5. The halogen incandescent lamp as claimed in claim 4, wherein the nitrogen oxide is $N_2O$.

6. The halogen incandescent lamp as claimed in claim 5, wherein the ratio between $C_2H_5I$ and $N_2O$ is between 3:1 and 1:3.

7. The halogen incandescent lamp as claimed in claim 1, wherein the molar ratio C:O $\subseteq$ 1.

8. The halogen incandescent lamp as claimed in claim 1, wherein the noble gas is krypton.

9. The halogen incandescent lamp as claimed in claim 1, wherein the proportion of the halogen additive is 0.02 to 2 mol %.

10. The halogen incandescent lamp as claimed in claim 1, wherein the lamp is a low-voltage lamp, in particular in low-pressure technology.

11. The halogen incandescent lamp as claimed in 1, wherein the nitrogen-oxygen compound is a nitrogen oxide.

12. The halogen incandescent lamp as claimed in claim 11, wherein the nitrogen-oxygen compound is $N_2O$.

13. The halogen incandescent lamp as claimed in claim 11, wherein the carbon is added as a halogenated hydrocarbon.

* * * * *